United States Patent
Bartig et al.

(10) Patent No.: US 9,919,356 B2
(45) Date of Patent: Mar. 20, 2018

(54) PUNCH-RIVETING DIE

(71) Applicant: NEWFREY LLC, Newark, DE (US)

(72) Inventors: Paul Bartig, Giessen (DE); Marco Wiessner, Giessen (DE)

(73) Assignee: NEWFREY LLC, New Britain, CT (US)

( * ) Notice: Subject to any disclaimer, the term of this patent is extended or adjusted under 35 U.S.C. 154(b) by 287 days.

(21) Appl. No.: 14/594,797

(22) Filed: Jan. 12, 2015

(65) Prior Publication Data

US 2015/0121679 A1    May 7, 2015

Related U.S. Application Data

(63) Continuation of application No. PCT/EP2013/062921, filed on Jun. 20, 2013.

(30) Foreign Application Priority Data

Jul. 13, 2012  (DE) ........................ 10 2012 013 829

(51) Int. Cl.
*B21J 15/04* (2006.01)
*B21J 15/02* (2006.01)
*B21J 15/36* (2006.01)
*F16B 19/08* (2006.01)

(52) U.S. Cl.
CPC ............ *B21J 15/04* (2013.01); *B21J 15/025* (2013.01); *B21J 15/36* (2013.01); *F16B 19/08* (2013.01); *Y10T 29/49943* (2015.01); *Y10T 29/53774* (2015.01)

(58) Field of Classification Search
CPC .......... B21J 15/025; B21J 15/04; B21J 15/36; F16B 19/06; F16B 19/08; F16B 19/086; F16B 19/10
See application file for complete search history.

(56) References Cited

U.S. PATENT DOCUMENTS

| | | | |
|---|---|---|---|
| 6,722,013 B1 * | 4/2004 | Rapp | B21D 39/031 29/283.5 |
| 6,883,223 B2 * | 4/2005 | Edwards | B21J 15/025 29/428 |
| 6,988,862 B1 | 1/2006 | Iguchi | |
| 7,412,869 B2 | 8/2008 | Kato | |
| 8,506,228 B2 | 8/2013 | Singh | |
| 8,763,233 B2 | 7/2014 | Bartig | |
| 2003/0167620 A1 * | 9/2003 | Wang | B21J 15/025 29/525.06 |

(Continued)

FOREIGN PATENT DOCUMENTS

WO    0100348 A    1/2001

OTHER PUBLICATIONS

Japanese Office Action dated Jun. 12, 2017.
European Search Report dated Aug. 7, 2017.

*Primary Examiner* — Christopher M Koehler
(74) *Attorney, Agent, or Firm* — Michael P. Leary

(57) ABSTRACT

A punch-riveting die comprises a basic body, which has a recess for forming an underside of a punch-rivet joint, the recess having a base and an annular wall. In a central region of the base, the die includes an annular radial-flow inhibiting device, which inhibiting device limits a radial material flow out of the inner region of the annular radial-flow inhibiting device.

16 Claims, 3 Drawing Sheets

(56) References Cited

U.S. PATENT DOCUMENTS

| | | | |
|---|---|---|---|
| 2004/0168297 A1* | 9/2004 | Nishimura | B21D 39/031 29/521 |
| 2004/0216304 A1* | 11/2004 | Naito | B21J 15/025 29/798 |
| 2005/0125985 A1* | 6/2005 | Adams | B21J 15/02 29/524.1 |
| 2006/0065699 A1* | 3/2006 | Lang | B21D 39/031 228/136 |
| 2013/0125611 A1* | 5/2013 | Danyo | B21J 15/025 72/470 |
| 2013/0224426 A1* | 8/2013 | Ellis | B21J 15/025 428/99 |
| 2013/0340239 A1* | 12/2013 | Ueda | B21J 15/025 29/525.06 |
| 2014/0041193 A1* | 2/2014 | Schlafhauser | B21J 15/025 29/432 |
| 2014/0234574 A1* | 8/2014 | Campbell | B32B 7/08 428/137 |
| 2015/0059156 A1* | 3/2015 | Diehl | B21J 15/04 29/509 |
| 2015/0239077 A1* | 8/2015 | Freis | B23P 19/04 29/243.53 |

\* cited by examiner

PUNCH-RIVETING DIE

CROSS-REFERENCE TO RELATED APPLICATIONS

This application is a continuation of PCT/EP2013/062921, filed on Jun. 20, 2013 which claims priority from German Patent Application No. 102012013829.6, filed on Jul. 13, 2012, the disclosures of which are incorporated herein by reference.

BACKGROUND OF THE INVENTION

The present invention relates to a punch-riveting die for a punch-riveting tool, comprising a basic body, which has a recess for forming an underside of a punch-rivet joint, the recess having a base and an annular wall.

Further, the present invention relates to a punch-riveting tool comprising a frame, on which a punch-riveting head comprising a punch-riveting punch is mounted so as to be movable in the punching direction, and on which such a punch-riveting die is fixed.

Finally, the present invention relates to a method for producing a punch-rivet joint of at least two workpieces by the use of such a punch-riveting die.

Normally, in the case of such a punch-riveting method, metallic sheet portions are joined to each other, in that a punch rivet is driven into the sheets by means of a punch.

A distinction is generally made in this case between punch-riveting methods that use solid rivets and those that use semi-hollow rivets. In the case of solid-rivet punch-riveting methods, the rivet itself is composed of a very hard material and is driven completely into the workpiece arrangement, in such a way that the punching residues are expelled. The joint is effected in this case in that the workpiece arrangement is pressed together such that material of at least one workpiece is pressed into a radial groove of the solid rivet.

The present case relates substantially to punch-riveting methods that use semi-hollow rivets. In the case of these rivets, the rivet has a head and a hollow shank that adjoins the latter. The rivet in this case is driven into a workpiece arrangement, the hollow shank widening radially and thereby creating a necessary back taper that results in permanent joining of the workpieces. In this case, the end of the shank does not protrude from the workpiece arrangement. Rather, a so-called residual base thickness of the material of the lowermost workpiece layer remains between the end of the rivet shank and the underside of the thus produced punch-rivet joint.

Such a punch rivet and a die for producing a punch-rivet joint are described in the document DE 10 2006 028 537 B3. This document, in one embodiment, proposes a punch-riveting die wherein a base surface is provided with a central cavity, the diameter of which is less than half the diameter of the recess, and which is of a depth that is greater than 0.3 times the outer diameter of the rivet shank. A radius having a value greater than or equal to 0.3 mm is provided at the transition between the cavity and the recess. The cavity is intended to provide for pressure relief in the joining process, with the result that excessive radial stresses in the punch-rivet joint are prevented and the risk of cracking is reduced.

Owing to the relatively great depth of the central cavity, the punch-rivet joints produced by means of such a punch-riveting die are very thick.

Further, it is generally difficult to produce punch-rivet joints that join two and in particular a plurality of workpieces to each other, it being necessary to use relatively long punch rivets.

BRIEF SUMMARY OF THE INVENTION

Against this background, it is an object of the invention to specify an improved punch-riveting die, an improved punch-riveting tool, and an improved method for producing a punch-rivet joint, it being possible to produce punch-rivet joints that are axially compact and/or satisfactory in respect of function and quality, this being the case even if more than two workpieces are to be joined to each other.

The above object is achieved, in the case of the punch-riveting die mentioned at the outset, in that an annular radial-flow inhibiting device is realized in a central region of the base, which inhibiting device limits a radial material flow out of the inner region of the annular radial-flow inhibiting device.

Whereas, in the document DE 10 2006 028 537 B3 described above, the approach followed is substantially that of providing for pressure relief in the central region during the material forming operation, the present invention proposes the provision of an annular radial-flow inhibiting device. What can be achieved in this case, because of the annular shape of the radial-flow inhibiting device, is that, although a relatively high pressure can prevail in the central region, the flow of the material, in particular of the lowermost workpiece layer, can nevertheless be limited in the radial direction.

This makes it possible to achieve a safe residual base thickness, particularly in the case of longer punch rivets of, for example, greater than 8 mm and, in particular, greater than 10 mm.

In other words, a safe residual base thickness is achieved by the annular shape and by the fact that a relatively high force can nevertheless be exerted in the central region.

By achieving a safe residual base thickness, it is possible to achieve a situation whereby the punch-rivet joint remains closed in the region between the end of the punch rivet and the underside of the punch-rivet joint, i.e., in particular, no cracks occur. This enables corrosion problems to be prevented.

Further, it is possible, preferably, to provide a punch-rivet joint having a relatively small axial thickness.

Preferably, the punch rivets that can be used have an overall axial length of greater than 6 mm, in particular greater than 7 mm. In particular, the overall length can be in the range from 8 to 14 mm.

The object is thereby achieved in full.

According to a particularly preferred embodiment, the radial-flow inhibiting device has an annular elevation on the base of the recess. The base of the recess in this case is preferably flat, but can also have a cavity, offset in relation to the base, in a central region within the annular elevation.

In the case of the punch-riveting method performed by means of such a punch-riveting die, a high pressure is exerted upon the material inside the rivet shank, through the pressure of the punch. Owing to the annular elevation in this case, particularly in the final stage of the forming operation, a radial flow of the material of the lowermost workpiece layer out of the central region within the annular elevation is prevented, or at least restricted. As a result, despite the high pressure, the residual base thickness is prevented from decreasing to zero, or cracks are prevented from occurring in this region.

Since a relatively high pressure can prevail in this central region, it is additionally possible to achieve safe spreading of the hollow shank in the region of the lowermost workpiece layer, such that a punch-rivet joint of high strength can be achieved.

It is particularly preferred in this case if the height of the annular elevation relative to the base is in a range or a height factor from 0.05 to 0.5 multiplied by the depth of the recess.

In particular, the height factor can be in the range from 0.1 to 0.4 and, particularly preferably, in the range from 0.15 to 0.25.

It has been found that annular elevations of such a height result in particularly good punch-rivet joint results.

According to a further preferred embodiment, the annular elevation is rounded in the region of its tip, the rounded portion having a tip radius in the range from 0.1 mm to 1 mm.

It is particularly preferred if the tip radius is in the range from 0.15 mm to 0.4 mm, in particular in the range from 0.2 mm to 0.3 mm.

The rounding makes it possible to prevent increased notch stresses.

According to an alternative embodiment, the annular elevation is realized with an acute angle towards its tip, i.e. is approximately triangular in cross section.

In the case of this embodiment, a radial flow can be inhibited to a greater extent, if necessary, it being necessary to ensure that the elevation is realized such that excessive notch stresses do not occur in the region of the tip.

According to a preferred embodiment, the annular elevation is flattened in the region of its tip.

This variant can be produced inexpensively, if necessary, and can nevertheless achieve the function of a radial-flow inhibiting device.

In the case of an annular elevation that is flattened in the region of its tip, its height relative to the base can also be in the range of a height factor of 0.01 to 0.3 multiplied by the depth of the recess.

Further, it is advantageous if the elevation diameter of the annular elevation is in the range of an elevation diameter factor from 1.0 to 2.0 multiplied by a shank inner diameter of a semi-hollow punch rivet that can be used with the punch-riveting die.

It is particularly preferred if the elevation diameter factor is in the range from 1.2 to 1.8, in particular in the range from 1.4 to 1.6.

What is achieved by this measure is that, even if the shank has already widened radially at its lower end during the punch-riveting process, a relatively large portion of the recess base beneath the widened punch-rivet shank is surrounded by the annular elevation, in order to prevent material from flowing out in the radial direction.

The elevation diameter in this case can be greater than 0.5 times, in particular greater than 0.55 times the diameter of the base of the recess.

According to a further preferred embodiment, which, in combination with the preamble of claim 1, constitutes a distinct invention, the radial-flow inhibiting device has a cavity on the base of the recess, which cavity limits a radial flow of material out of the cavity. The cavity on the base in this case is preferably realized such that this cavity does not substantially decrease the pressure inside the shank of the punch rivet during the punch-riveting process, such that safe spreading of the shank is possible even in the case of punch-rivet joints with long punch rivets and/or more than two workpieces. Because of the edge of the cavity in this case, however, a radial flow of material out of the region of the cavity is limited, such that a safe residual base thickness can nevertheless be achieved.

In general, it is possible for the cavity to be of a uniform depth, i.e. to be flat on the base of the cavity. Safe residual base thicknesses can be achieved as a result.

According to an alternative preferred embodiment, the cavity is an annular cavity.

In the case of an annular cavity, the inner region of the annular cavity is capable of maintaining a relatively high pressure in the inner region of the rivet shank during the punch-rivet joining operation.

The inner region of the annular cavity in this case can be aligned so as to be at least partially flush with the base of the recess.

It is particularly preferred, however, if the inner region of the annular cavity is offset relative to the base of the recess.

It can thereby be ensured that material flows into the cavity as a result of the axial pressure of the punch, the radial flow being limited by the outer diameter of the annular cavity.

In general, the inner region of the annular cavity can be realized in the manner of a convexity, or projection. In particular, the annular cavity can be realized with a W shape in cross section.

In general, it is preferred, irrespective of the type of cavity, if the cavity has a depth in the range of a depth factor from 0.05 to 0.5 multiplied by the depth of the recess.

Because of this relatively small depth, it is possible to achieve a relatively high pressure inside the punch-rivet shank, in particular in the region of the end of the punch-rivet shank, during the punch-riveting process, such that safe spreading can be achieved even in the case of a large number of workpieces to be joined and/or a long axial length of the punch rivet.

The depth factor is preferably in the range from 0.1 to 0.4, in particular in the range from 0.15 to 0.25.

According to a further preferred embodiment, a cavity diameter of the cavity is in the range of a cavity diameter factor from 0.1 to 1.0 multiplied by a shank inner diameter of a semi-hollow punch rivet that can be used with the punch-riveting die.

In the case of this embodiment, the radial flow is limited in a central region, which consequently is smaller than the widened end of the hollow punch-rivet shank.

It has been found that there may be a risk of an inadmissible reduction of the residual base thickness, in particular in such a central region, such that the limitation of the radial flow in this region can be sufficient to realize the desired quality of punch-rivet joint.

It is particularly preferred in this case if the cavity diameter factor is in the range from 0.5 to 1.0, in particular in the range from 0.8 to 1.0.

In general, it is conceivable for the transitions from an annular outer wall of the cavity, which ultimately limits the radial flow, to a cavity base, or a recess base, to be realized so as to be angular.

It is preferred, however, if these transitions are provided with radii.

According to a particularly preferred embodiment, a transition from an annular outer wall of the cavity to a cavity base of the cavity is rounded, such that the rounded portion has a cavity base radius in the range from 0.1 mm to 1 mm, in particular in the range 0.3 mm to 0.7 mm, particularly preferably in the range from 0.4 mm to 0.6 mm.

In particular in combination with the above-mentioned depth of the cavity, it is possible in this case to achieve, on the one hand, a sufficient limitation of the radial flow of material of the lowermost workpiece and, at the same time, to prevent inadmissible stresses, or separation edges.

For comparable reasons, it is preferred if a transition from an annular outer wall of the cavity to the base of the recess is rounded, the rounded portion having a cavity transition radius in the range from 0.1 mm to 2 mm, in particular in the range from 0.1 mm to 1 mm, particularly preferably in the range from 0.1 mm to 0.6 mm, and preferably in the range from 0.2 mm to 0.4 mm.

The above object is further achieved by a punch-riveting tool comprising a frame, on which a punch-riveting head comprising a punch-riveting punch is mounted so as to be movable in the punching direction, and on which such a punch-riveting die is fixed.

Finally, the above object is achieved by a method for producing a punch-rivet joint of at least two, preferably at least three workpieces, which are disposed on the top side of a punch-riveting die of the type according to the invention, comprising the step of driving a semi-hollow punch rivet into the uppermost workpiece, a hollow shank of the semi-hollow punch rivet also penetrating into the lowermost workpiece and widening radially therein, an underside of the punch-rivet joint being formed by the punch-riveting die.

It is understood that the above-mentioned features and those yet to be explained in the following can be applied, not only in the respectively specified combination, but also in other combinations or singly, without departure from the scope of the present invention.

BRIEF DESCRIPTION OF THE DRAWINGS

Exemplary embodiments of the invention are represented in the drawing and explained more fully in the following description. In the drawing.

DETAILED DESCRIPTION OF THE PREFERRED EMBODIMENTS

Figure 1:
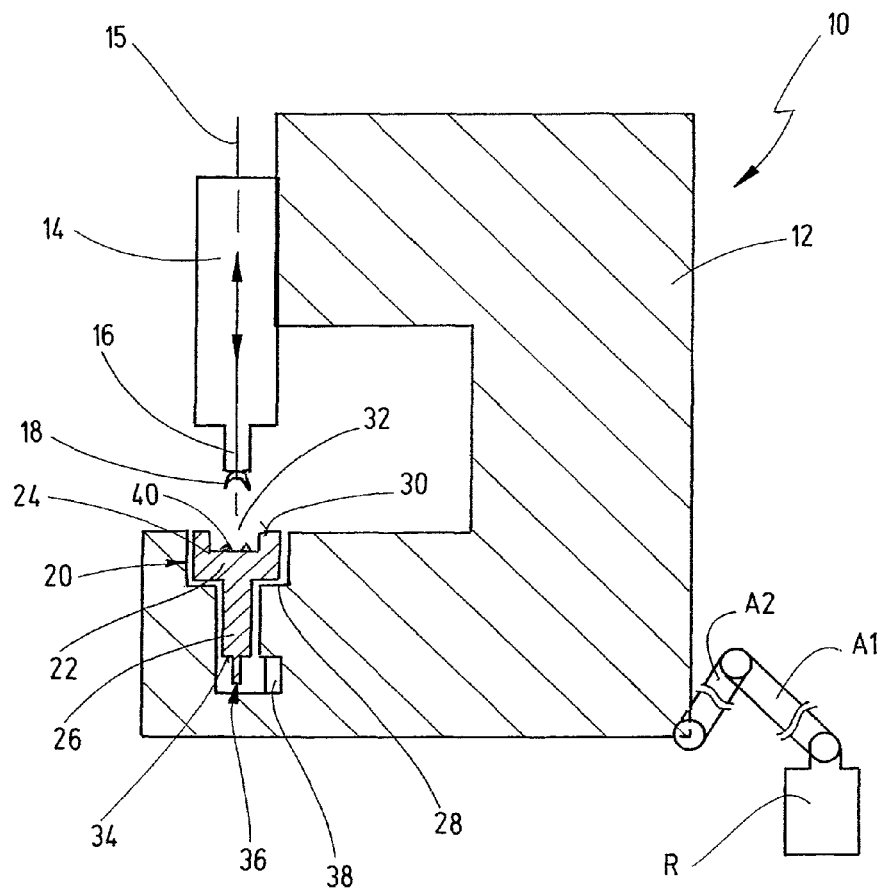
FIG. 1 shows a schematic representation of a punch-riveting tool according to the invention, with a punch-riveting die according to the invention.

A punch-riveting tool is represented in schematic form in FIG. 1 and denoted generally by 10.

The punch-riveting tool 10 has a frame 12, which is realized as a so-called C-frame. At the upper end of the frame 12, a carriage 14 is mounted so as to be displaceable along a longitudinal axis (punching axis) 15. A punch 16, for performing a punch-riveting process, is disposed on the carriage 14. A punch rivet 18 is held by means of a holding device, not denoted in greater detail, on the punch 16.

Further realized on the frame 12 is a die receiver 20, for receiving a punch-riveting die 22.

The punch-riveting die 22 has a basic body 24 and has a die shank 26, of a lesser diameter, extending axially therefrom. A radial surface at the transition between the basic body 24 and the shank 26 bears on a shoulder 28 of the die receiver 20. The basic body 24 is preferably rotationally symmetrical in form.

The punch-riveting die 22 has a first axial side 30 (top side) that faces towards the punch 16. Realized on the first axial side 30 is a recess 32 for receiving material to be formed.

The punch-riveting die 22 further has a second axial side 34, which is constituted by an axial end face of the die shank 26.

In a punch-riveting process, usually, two or more workpieces in the form of sheets are disposed between the punch 16 and the die 22. Further, it is possible to fix the workpiece stack in position from the top side in relation to the punch-riveting die 22. The punch 16 is then moved downwards along the longitudinal axis 15, as a result of which the punch rivet 18 is driven into the workpiece arrangement. A hollow shank of the punch rivet 18 in this case deforms radially within the workpieces and is deflected radially outwards, as a result of which a non-positive and/or positive joint is produced between the workpieces. The recess 32 of the punch-riveting die 22 in this case, because of its special shape, is instrumental in this type of material deformation of the workpieces, or of the punch rivet 18. The quality of the punch-rivet joint produced as a result is influenced considerably by the punch rivet 18 used and by the punch-riveting die 22. Punch-rivet joints of this type are preferably used in the field of motor vehicle engineering, preferably in the field of body shell construction. Workpieces of differing materials can be joined together by punch-rivet joints of this type.

In order for mistaken interchange of dies to be prevented in a process-safe manner, the punch-riveting die 22 has coding means 36, which are preferably realized on the second axial side 34 of the die 22. Decoding means 38 that can decode the coding means 36 when the punch-riveting die 22 has been inserted, in order to detect whether the inserted punch-riveting die is the correct die for the planned process, can be provided in the region of the die receiver 22.

It is further shown in FIG. 1 that the punch-riveting tool 10 can be fixed, for example, to a robot R, which has a first arm A1 and/or a second arm A2 and, possibly, further arms.

Further, FIG. 1 shows that a radial-flow inhibiting device 40 is disposed at the base of the recess 32 of the punch-riveting die 22. The radial-flow inhibiting device inhibits, or limits, a material flow of the material of the lowermost workpiece during the punch-riveting process, in such a way that a sufficient residual base thickness can be achieved for the punch-rivet joint produced, this being the case even when relatively thick workpiece stacks and/or workpiece stacks having three or more workpieces and/or punch rivets having a long overall axial length are used.

Figures 2, 3:
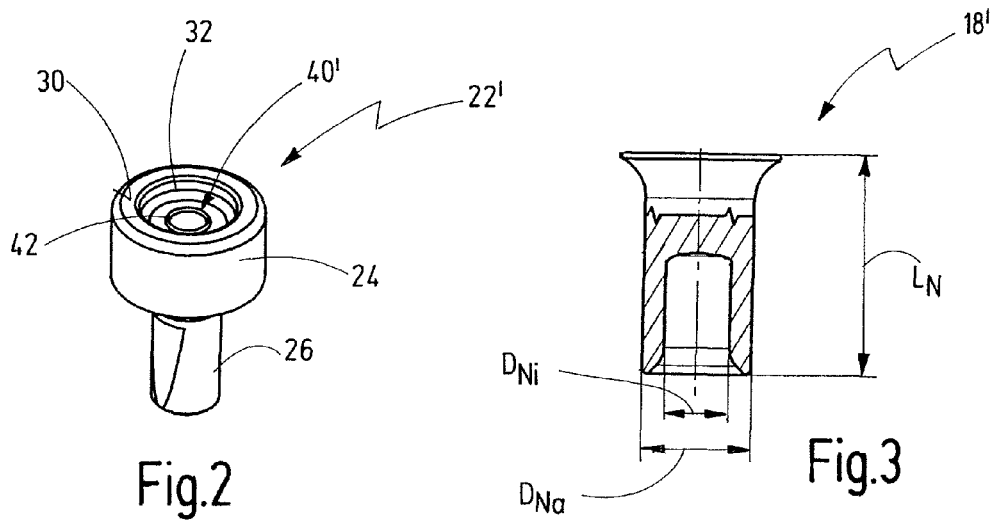
FIG. 2 shows a perspective view of a further embodiment of a punch-riveting die according to the invention.
FIG. 3 shows a partially sectional longitudinal view of a punch rivet that can be used in the case of the punch-riveting method according to the invention and in combination with the punch-riveting die according to the invention.

FIG. 2 shows a perspective view of a further embodiment of such a punch-riveting die 22', which corresponds generally to the punch-riveting die, described above, in respect of structure and manner of functioning. Elements that are the same are therefore denoted by the same reference numerals. In the following, it is substantially the differences that are explained.

Thus, in the case of the punch-riveting die 22', an annular elevation 42 is realized in a central region of the base of the recess 32, which elevation constitutes the radial-flow inhibiting device 40'. Details of this annular elevation 42 are explained in the following with reference to FIG. 4, which shows a cross-sectional view through the basic body 24 of the punch-riveting die 22'.

Firstly, however, a typical punch rivet 18' is to be explained with reference to FIG. 3, which punch rivet can be used in combination with the punch-riveting die described above and/or with each of the punch-riveting dies that are to be described in the following.

The punch rivet 18' is realized as a so-called C-rivet, and has an overall axial length $L_N$, which is preferably greater than 6 mm, preferably greater than 7 mm and, in particular, can be in the range from 8 mm to 15 mm.

Further, the punch rivet 18' has a head, not designated further, realized as a countersunk head and, adjoining the latter, has a shank realized as a hollow shank. An outer diameter of the hollow shank is denoted by $D_{Na}$ and can be, for example, in the range from 5 to 6 mm, in particular in the range from 5.2 to 5.5 mm.

The inner diameter $D_{Ni}$ of the shank is preferably in the range from 3 to 3.5 mm, in particular in the range from 3.1 to 3.3 mm.

Figure 4:
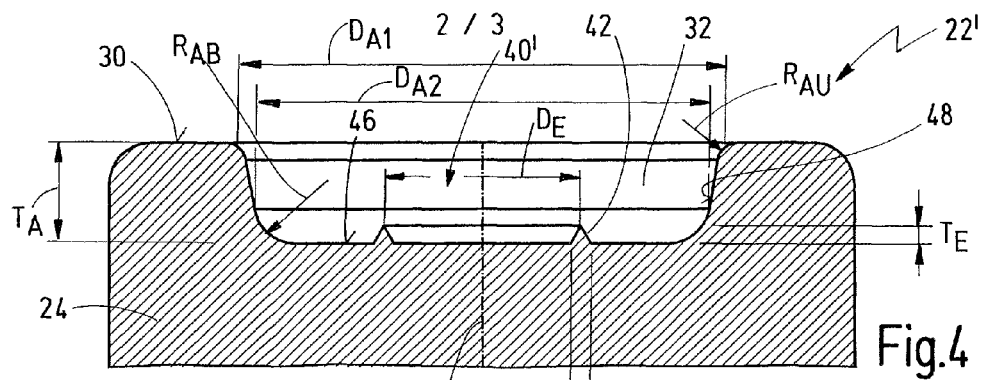
FIG. 4 shows a cross-sectional view of the upper part of the basic body of the punch-riveting die of FIG. 2.

FIG. 4 shows a cross-sectional view through the basic body 24 of the punch-riveting die 22' of FIG. 2.

The recess 32 on the top side 30 of the basic body 24 has an axial depth $T_A$, which is preferably in the range from 2 to 3 mm, in particular in the range from 2.2 to 2.6 mm. Further, the recess 32 has a base 46, aligned generally transversely in relation to the longitudinal axis, and has an annular wall 48 extending between the base 46 and the top side 30.

The wall 48 in this case is realized in the manner of a truncatedcone surface, having a taper angle in the range from 15 to 25°, in particular in the range from 17.5 to 22.5°.

The wall 48 graduates into the base 46, via a recess base radius $R_{AB}$. The recess base radius $R_{AB}$ is preferably in the range from 0.5 to 2 mm, in particular in the range from 0.75 to 1.5 mm, and preferably is 1 mm.

Further, the wall 48 graduates into the top side 30 of the basic body 24, via a rounded portion, wherein the recess transition radius $R_{AU}$ used for this purpose can be in the range from 0.1 to 1 mm, in particular in the range from 0.25 to 0.75 mm, and in particular in the range from 0.4 to 0.6 mm.

At its upper end, adjacent to the transition radius $R_{AU}$, the wall 48 has a first recess diameter $D_{A1}$, which can be, for example, in the range from 10 to 13 mm, in particular in the range from 10.5 mm to 12.5 mm, in particular in the range from 11 to 12 mm.

Further, adjacent to the base radius $R_{AB}$, the wall has an axially lower, second recess diameter $D_{A2}$, which can be, for example, in the range from 10 to 12 mm, in particular in the range from 10.5 to 11.5 mm.

An outer diameter, not designated in greater detail, of the base 46 (radially within the base radius $R_{AB}$) is preferably in the range from 8 to 10 mm, in particular in the range from 8.5 to 9.5 mm.

The annular elevation 42 is disposed concentrically in relation to the longitudinal axis 15, and has a height $T_E$ that is in a range of a height factor from 0.05 to 0.5 multiplied by the depth $T_A$ of the recess 32. The axial height $T_E$ of the annular elevation relative to the base 46 can be, for example, in the range from 0.2 to 0.8 mm, in particular in the range from 0.3 to 0.7 mm, in particular in the range from 0.4 to 0.6 mm.

The annular elevation 42 is triangular in cross section, being realized with an acute angle towards its tip. On the axial height of the base 46, the annular elevation 42 has a radial thickness, or radial width, $B_E$, which can be, for example, in the range from 0.5 mm to 2 mm, in particular in the range from 0.2 to 1 mm.

The diameter $D_E$ of the annular elevation is preferably in a range of an elevation diameter factor from 1.0 to 2.0 multiplied by the shank inner diameter $D_{Ni}$ of the semi-hollow punch rivet 18' used. For example, the elevation diameter $T_E$ can be in the range from 4 to 6 mm, in particular in the range from 4.5 to 5.3 mm, in particular in the range from 4.7 to 4.9 mm. In this case, the diameter $D_E$ of the annular elevation 42 is measured in relation to the tip of the annular elevation.

In the case of a punch-riveting method performed by means of the punch-riveting die 22', the axial force exerted upon the punch-riveting punch causes a deformation of the workpieces, in such a way that the latter penetrate, at least partially, into the region of the recess 32. Consequently, because of the recess 32, the underside of the finished punch-rivet joint is formed. When the lowermost workpiece layer goes into the region of the base 46 of the recess, the flow of material of the lowermost workpiece in the radial direction, out of the annular elevation 42, is inhibited. It can thereby be ensured that punch-rivet joints can be formed with a sufficiently large residual base thickness. Owing to the fact that substantially no pressure relief, or only a small amount of pressure relief, occurs in the central region within the annular elevation, it is possible at the same time to achieve appropriate widening of the shank of the punch rivet, since a sufficiently high pressure can be built up inside the shank.

Figure 5:
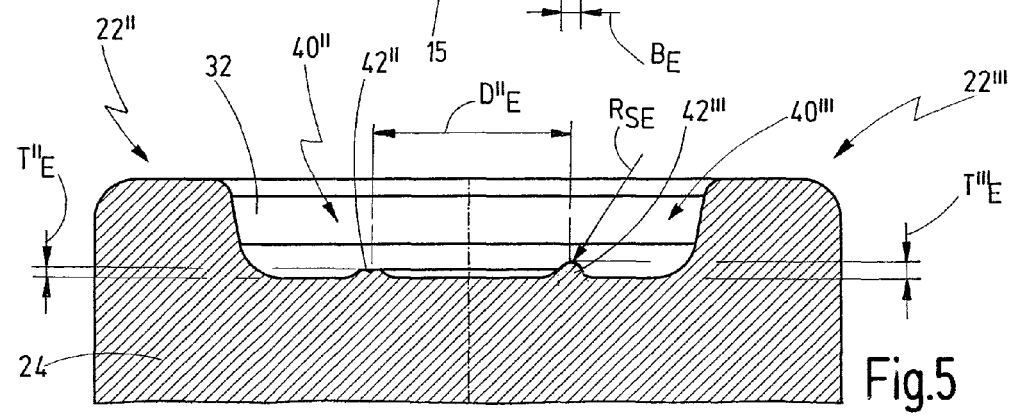
FIG. 5 shows two alternative embodiments of punch-riveting dies according to the invention.
Figure 6:
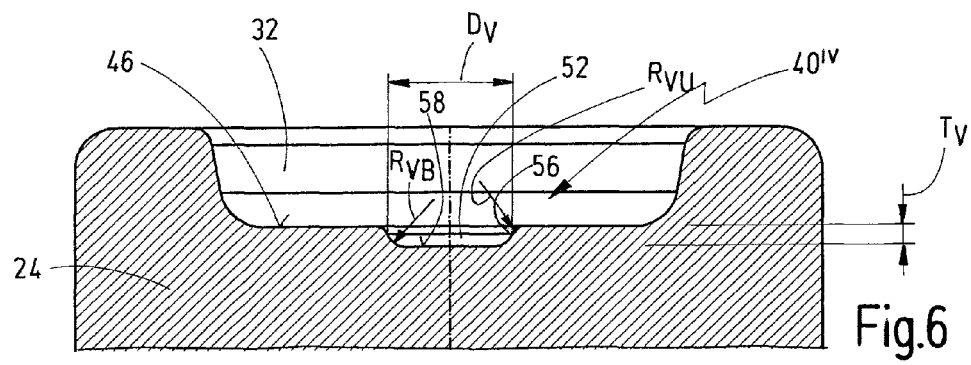
FIG. 6 shows a further embodiment of a punch-riveting die according to the invention.
Figure 7:
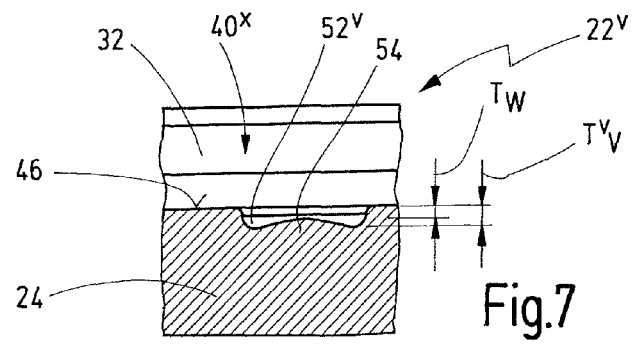
FIG. 7 shows a further embodiment of a punch-riveting die according to the invention.

FIGS. 5 to 7 that follow show further embodiments of punch-riveting dies according to the invention, which correspond generally to the punch-riveting die, described above, in respect of structure and manner of functioning. Elements that are the same are therefore denoted by the same reference numerals. In particular, in the case of all the embodiments below, the design of the recess 32 is identical to the embodiment described above. In the following, it is substantially the differences that are explained.

FIG. 5, on the left side, shows a further embodiment of a punch-riveting die 22', which has an annular elevation 42" that is flattened in the region of its tip. In the case of this embodiment, the corresponding height $T_E''$ can be less than in the case of the embodiment described above and, in particular, can be in the range of a height factor from 0.02 to 0.3 multiplied by the depth $T_A$ of the recess 32.

Shown on the right side of FIG. 5 is a further embodiment of a punch-riveting die 22''', wherein an annular elevation 42''' is rounded in the region of its tip. In this case, the tip radius $R_{SE}$ shown in FIG. 5 is preferably in a range from 0.1 mm to 1 mm, in particular in a range from 0.15 mm to 0.4 mm, and particularly preferably in a range from 0.2 mm to 0.3 mm.

The height $T_E'''$ of the annular elevation 42''' in this case can be identical to the height $T_E$ of the annular elevation 42 in FIG. 4.

Further, in the case of this embodiment, it is preferred if the annular elevation graduates into the base 46 of the recess 32, via a transition radius, the elevation transition radius, not designated in greater detail in FIG. 5, preferably being in a range of 1.5 to 2.5 times the tip radius $R_{SE}$, and preferably in a range from 0.3 to 0.7 mm.

FIG. 6 shows a further punch-riveting die $22^{IV}$, which, in a variant, instead of having an annular elevation, has a central cavity on the base 46 of the recess 32, the cavity being denoted by 52 in FIG. 6. In another variant, the cavity 52 can be combined with the elevations 42 described above.

The cavity 52 has a depth $T_V$ relative to the base 46, in the range of a depth factor from 0.05 to 0.5 multiplied by the depth $T_A$ of the recess. It is particularly preferred if the depth factor is in the range from 0.1 to 0.4, in particular in the range from 0.15 to 0.25.

Owing to the small axial depth achieved as a result, during the punch-riveting operation a sufficiently high pressure can be maintained in the central region of the recess 32 to provide for proper widening of the shank of the punch rivet 18'. The cavity 52 has a cavity base 58, aligned parallel to the base 46. Further, the cavity 52 has an outer wall 56, which connects the cavity base 58 to the recess base 46.

The cavity 52 in this case can be provided with a cavity diameter $D_V$ that is in the range of a cavity diameter factor from 0.1 to 1.0 multiplied by a shank inner diameter $D_{Ni}$ of the semi-hollow punch rivet 18. In particular, the cavity diameter factor is in the range from 0.5 to 1.0, in particular in the range from 0.8 to 1.0. Preferably, a cavity diameter factor is from 0.9 to 1.0.

The cavity diameter $D_V$ corresponds in this case to the diameter of a bore, by means of which the cavity 52 can be produced. Starting from the cavity diameter $D_V$, the outer wall 56 graduates into the recess base 46, via a cavity transition radius $R_{VU}$, wherein the cavity transition radius $R_{VU}$ can be in the range from 0.1 mm to 2 mm, in particular in the range from 0.2 mm to 0.4 mm.

Further, realized between the cavity diameter $D_V$ and the cavity base 58 there is a cavity base radius $R_{VB}$, which is preferably greater than the cavity transition radius $R_{VU}$ and which can be, for example, in the range from 0.1 mm to 1 mm, and preferably from 0.3 mm to 0.7 mm, in particular in the range from 0.4 mm to 0.6 mm.

FIG. 7 shows a punch-riveting die $22^V$, which corresponds generally to the punch-riveting die $22^{IV}$ in respect of structure and manner of functioning. Elements that are the same are therefore denoted by the same reference numerals.

In this case, the cavity $52^V$ is realized as an annular cavity. The outer wall 56 and the transition radii can be realized in a manner identical to that of the embodiment of FIG. 6.

Realized in the central part of the cavity 52, however, there is a projection 54, the axial height $T_W$ of which is less than the depth $T_V$ of the cavity $52^V$. As a result, an inner region of the annular cavity $52^V$ is offset relative to the base 46 of the recess 32.

Owing to this provision, the pressure can be kept relatively high in a central region during the punch-riveting operation.

In the case of the embodiments of FIGS. 6 and 7, the outer wall 56 of the cavities 52, $52^V$ performs the function, in particular, of the radial-flow inhibiting device.

Figure 8:
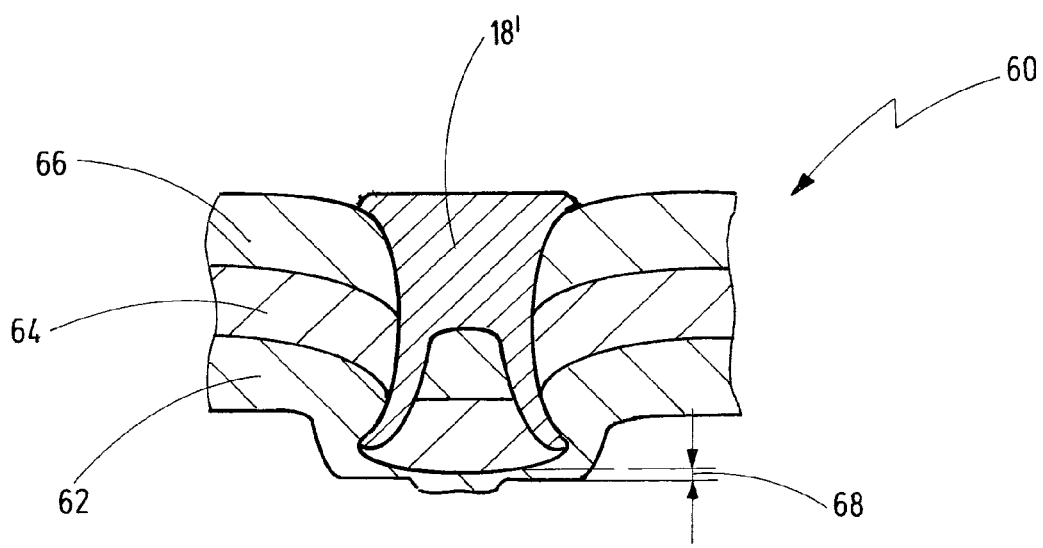
FIG. 8 shows a punch-rivet joint produced by means of the punch-riveting die of FIG. 6.

Represented in FIG. 8 is a punch-rivet joint 60 produced by means of the punch-riveting die $22^{IV}$. Further, a punch rivet 18' according to FIG. 3 has been used to produce the punch-rivet joint. The punch-rivet joint 60 in this case joins a first workpiece 62, a second workpiece 64 and a third workpiece 66, the third workpiece 66 being the uppermost workpiece, the top side of which is aligned so as to be approximately flush with the top side of the punch rivet 18'. The shank of the punch rivet 18' in this case has punched through the third and the second workpiece 64, in such a way that the punched-through material thereof is inside the hollow shank of the punch rivet 18'. Further, the hollow shank has widened in the radial direction, in particular in the region of the lowermost workpiece 62, such that a non-positive or positive joint is produced between the uppermost workpiece 66 and the lowermost workpiece 62.

The underside of the punch-rivet joint 60 substantially assumes the shape of the recess 32 of the punch-riveting die $22^{IV}$. Further, in this case, in a central, lower region, there is a projection, the shape of which corresponds to that of the cavity 52.

Owing to the cavity 52, the radial flow in the central region is limited, or inhibited, while the forming is performed, in such a way that there is a sufficient residual base thickness 68 of the material of the lowermost workpiece 62, which, in particular, has no cracks or the like, such that the risk of corrosion is reduced.

It will be appreciated by persons skilled in the art that the above embodiments have been described by way of example only, and not in any limitative sense, and that various alterations and modifications are possible without departure from the scope of the invention as defined by the appended claims.

What is claimed is:

1. A punch-riveting die of a punch-riveting tool for setting a semi-hollow punch rivet with a rivet shank inner diameter ($D_{Ni}$) into a punch rivet joint, the punch-riveting die comprising:
   a basic body including an inner base and an inner annular wall, the inner base and inner annular wall partially defining a recess for forming an underside of a punch-rivet joint, the recess defining an axial recess depth ($T_A$);
   wherein the basic body further includes a central cavity extending axially below the base of the recess, and the cavity is operative to limit radial material flow out of an inner region during formation of the punch rivet joint; and
   wherein the cavity further includes a central axial projection, and the projection defines an axial height ($T_W$) which is less than a depth ($T_V$) of the cavity, and the projection is below the base of the recess.

2. A punch-riveting die according to claim 1, wherein the cavity is an annular cavity.

3. A punch-riveting die according to claim 1, wherein the cavity depth ($T_V$) is in the range calculated by multiplying the recess depth ($T_A$) by a depth factor from 0.05 to 0.5.

4. A punch-riveting die according to claim 1, wherein the cavity depth ($T_V$) is in the range calculated by multiplying the recess depth ($T_A$) by a depth factor from 0.15 to 0.25.

5. A punch-riveting die according to claim 1, wherein the cavity defines a cavity diameter ($D_V$), and the cavity diameter ($D_V$) is in the range calculated by multiplying the rivet shank inner diameter ($D_{Ni}$) by a diameter factor from 0.1 to 1.0.

6. A punch-riveting die according to claim 5, wherein the cavity diameter ($D_V$) is in the range calculated by multiplying the rivet shank inner diameter ($D_{Ni}$) by a diameter factor from 0.8 to 1.0.

7. A punch-riveting die according to claim 1, wherein the die further includes a cavity annular outer wall and a cavity base located in the basic body, and a first rounded transition portion between the cavity annular wall and the cavity base; and the rounded transition portion defines a cavity base radius ($R_{VB}$) in the range from 0.1 mm to 1 mm.

8. A punch-riveting die according to claim 7, wherein the die further includes a second rounded transition portion between the base of the recess and the cavity annular outer wall, the second rounded transition portion defining a cavity transition radius ($R_{VU}$) in the range from 0.1 mm to 2 mm.

9. A punch-riveting tool for setting a semi-hollow punch rivet with a rivet shank inner diameter ($D_{Ni}$) into a punch rivet joint, the punch-riveting tool comprising:

a frame;

a punch-riveting head movable in a punching direction and including a punch-riveting punch operable for mounting the punch rivet to be set into the punch rivet joint; and a punch-riveting die mounted to the frame opposite the punch riveting head along the punching direction, the punch-riveting die including; a basic body including an inner base and an inner annular wall, the inner base and inner annular wall partially defining a recess for forming an underside of a punch-rivet joint, the recess defining an axial recess depth ($T_A$); and wherein the basic body further includes a central cavity extending axially below the base of the recess, and the cavity further includes a central axial projection, and the projection defines an axial height $T_W$ which is less than a depth $T_V$ of the cavity, and the projection is below the base of the recess.

10. A punch-riveting die of a punch-riveting tool for setting a semi-hollow punch rivet with a rivet shank inner diameter ($D_{Ni}$) into a punch rivet joint, the punch-riveting die comprising: a die body including a top side, the die body partially defining an axial recess open at the top side and axially closed opposite to the top side by a base and surrounded radially by a wall, and the recess defines an axial recess depth ($T_A$); and the die body further defines a central cavity axially open into the recess and extending axially below the base of the recess, and the cavity defines a cavity diameter ($D_V$), and the cavity diameter ($D_V$) is in the range calculated by multiplying the rivet shank inner diameter ($D_{Ni}$) by a diameter factor from 0.1 to 1.0.

11. A punch-riveting die according to claim 10, wherein the cavity further includes a central axial projection, and the projection defines an axial height $T_W$ which is less than a depth $T_V$ of the Cavity, and the Projection is below the base of the recess.

12. A punch-riveting die according to claim 10, wherein the cavity defines a cavity depth ($T_V$) in the range calculated by multiplying the recess depth ($T_A$) by a depth factor from 0.05 to 0.5.

13. A punch-riveting die according to claim 10, wherein the cavity defines a cavity depth ($T_V$) in the range calculated by multiplying the recess depth ($T_A$) by a depth factor from 0.15 to 0.25.

14. A punch-riveting die according to claim 10, wherein the cavity diameter ($D_V$) is in the range calculated by multiplying the rivet shank inner diameter ($D_{Ni}$) by a diameter factor from 0.8 to 1.0.

15. A punch-riveting die according to claim 10, wherein the die further includes a cavity annular outer wall and a cavity base located in the basic body, and a first rounded transition portion between the cavity annular wall and the cavity base; and the rounded transition portion defines a cavity base radius ($R_{VB}$) in the range from 0.1 mm to 1 mm.

16. A punch-riveting die according to claim 15, wherein the die further includes a second rounded transition portion between the base of the recess and the cavity annular outer wall, the second rounded transition portion defining a cavity transition radius ($R_{VU}$) in the range from 0.1 mm to 2 mm.

* * * * *